(12) United States Patent
Wu et al.

(10) Patent No.: US 9,398,283 B2
(45) Date of Patent: Jul. 19, 2016

(54) SYSTEM AND METHOD OF ALARM AND HISTORY VIDEO PLAYBACK

(71) Applicant: Honeywell International Inc., Morristown, NJ (US)

(72) Inventors: Jizong Wu, Shanghai (CN); Yu Qiu, Shanghai (CN); Haifeng Tong, Shanghai (CN); Yuhang Dang, Shanghai (CN)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 429 days.

(21) Appl. No.: 13/764,914

(22) Filed: Feb. 12, 2013

(65) Prior Publication Data
US 2014/0226951 A1    Aug. 14, 2014

(51) Int. Cl.
| H04N 7/18 | (2006.01) |
| H04N 9/87 | (2006.01) |
| G08B 13/196 | (2006.01) |
| G11B 27/10 | (2006.01) |

(52) U.S. Cl.
CPC ............ *H04N 9/87* (2013.01); *G08B 13/19669* (2013.01); *G08B 13/19673* (2013.01); *G08B 13/19682* (2013.01); *G08B 13/19695* (2013.01); *G11B 27/10* (2013.01); *G08B 13/19676* (2013.01)

(58) Field of Classification Search
CPC .............. H04N 9/87; G08B 13/19673; G08B 13/19682; G08B 13/19669; G08B 13/19695; G11B 27/10; G06F 3/00
USPC .................... 348/143, 159; 715/723, 719, 721
See application file for complete search history.

(56) References Cited

U.S. PATENT DOCUMENTS

| 5,680,558 | A | * | 10/1997 | Hatanaka et al. | 715/838 |
| 7,996,771 | B2 | * | 8/2011 | Girgensohn et al. | 715/723 |
| 2003/0025599 | A1 | * | 2/2003 | Monroe | G08B 13/19602 340/531 |
| 2004/0117638 | A1 | | 6/2004 | Monroe | |
| 2005/0122397 | A1 | * | 6/2005 | Henson et al. | 348/143 |

(Continued)

FOREIGN PATENT DOCUMENTS

| EP | 2 390 853 A1 | 11/2011 |
| WO | WO 2006/046234 A2 | 5/2006 |

OTHER PUBLICATIONS

European Search Report for corresponding EP application 14152681.4, dated Aug. 4, 2014.

(Continued)

*Primary Examiner* — Trang U Tran
(74) *Attorney, Agent, or Firm* — Husch Blackwell LLP

(57) ABSTRACT

An apparatus and method of using a security system are provided. The method includes the steps of providing a two-dimensional map of geographical features of a secured area on a display, arranging a respective icon for each of a plurality of security sensors on the map, wherein a relative location of the respective icon of each of the plurality of security sensors on the two-dimensional map indicates the relative location of the sensor with respect to each of the geographical features of the map and wherein the respective icon of each of the plurality of sensors that is activated is shown highlighted on the map and providing an adjustable time control device with a time indicator on the map, the time control device causing each of the plurality of icons to enter a highlighted state during each concurrence in time between the activated state of the corresponding sensor and the time indicator.

20 Claims, 2 Drawing Sheets

(56) References Cited

U.S. PATENT DOCUMENTS

2006/0288288 A1 12/2006 Girgensohn et al.
2011/0130957 A1 6/2011 M et al.
2012/0194336 A1 8/2012 Thiruvengada et al.

OTHER PUBLICATIONS

Examination Report for corresponding EP application 14152681.4, dated Aug. 19, 2014.

* cited by examiner

SYSTEM AND METHOD OF ALARM AND HISTORY VIDEO PLAYBACK

FIELD

The field of the invention relates to security systems and more particularly to video collected from secured areas.

BACKGROUND

Security systems are used to help protect people and property within a secured area. Often a number of sensors may be placed around and/or within the secured area to detect security events. Security events may be defined as the presence of one or more unwanted people within the secured area or of some unwanted event such as a fire.

In most cases, the sensors are connected to an alarm panel that is used to monitor the sensors. Upon detecting the activation of a sensor, the alarm panel may activate a local alarm and/or send an alarm message to a central monitoring station.

The sensors may be limit switches designed to detect the opening of a door or window or the sensors may be designed to detect motion. In many cases, the detection of motion is accomplished through the use of a video camera and associated processor that compares successive frames to detect the movement of people within the secured area.

Many security systems maintain a log of activity within the system. Activity in this case may mean a time of activation of the various sensors and the recording of video from cameras within the area.

In the event of an event, the log may be reviewed to determine a sequence of events within the secured area. However, the log may be tedious and hard to read or understand. Accordingly, a need exists for better methods of displaying logged events within secured areas.

DETAILED DESCRIPTION OF AN ILLUSTRATED EMBODIMENT

Figure 1:
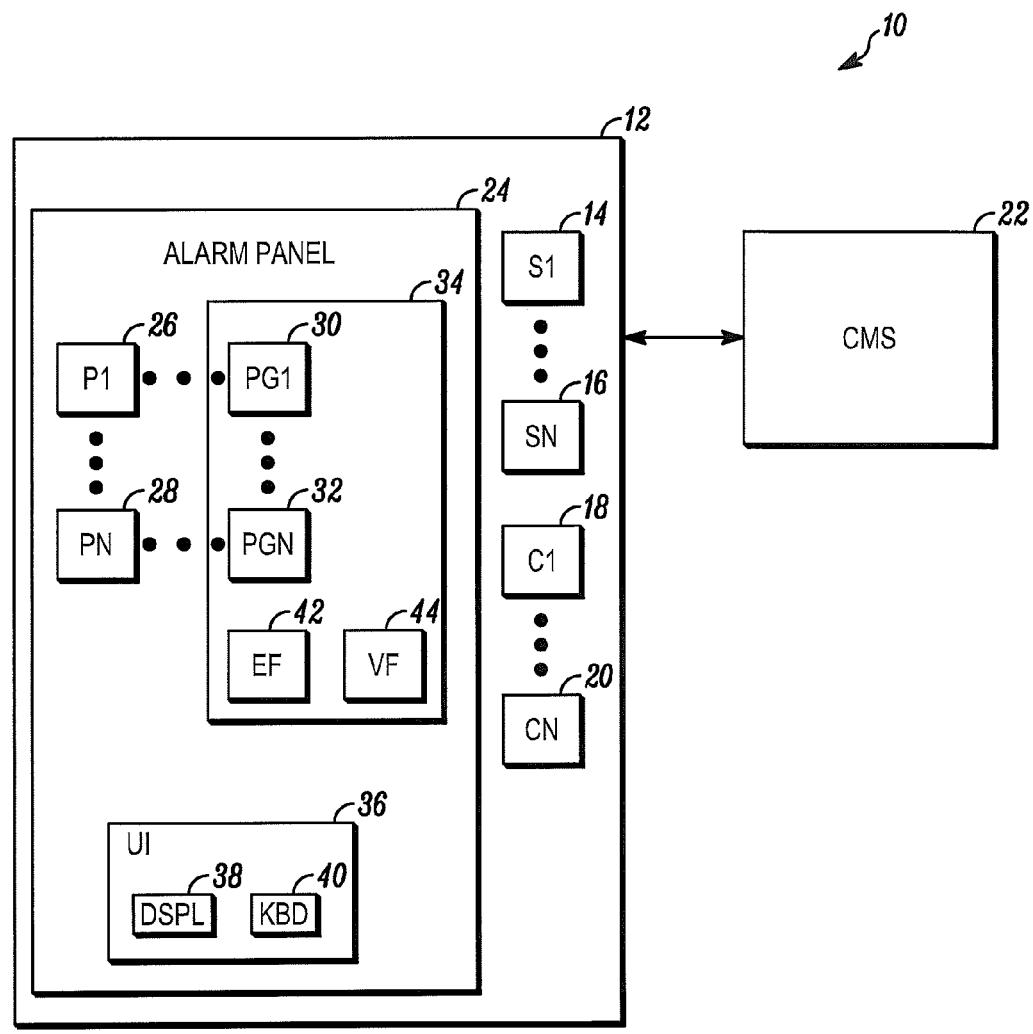
FIG. 1 depicts an alarm system under one illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 depicts a security system 10 shown generally in accordance with an illustrated embodiment. Included within the security system 10 may be a number of sensors 14, 16 that detect threats within a secured area 12. The sensors 14, 16 may be limit switches disposed on doors or windows or any other opening that provide entrance into or egress from the secured area 12. Alternatively, the sensors 14, 16 may be fire or gas detectors.

Also included within the secured area 12 may be one or more video cameras 18, 20. The video cameras 18, 20 may be used to detect intruders via motion detection or to simply record events within or around the secured area 12.

The sensors 16, 18 and cameras 18, 20 may be coupled to an alarm panel 24. The alarm panel 24 may be used to monitor the sensors 14, 16 and cameras 18, 20 for security threats. Upon detection of a threat, the alarm panel may send an alarm message to a central monitoring station 22. Upon receipt of an alarm message, the central monitoring station 22 may summon the police or fire departments, depending upon the type of event detected.

Located within the alarm panel 24 (and cameras 18, 20) may be one or more processor apparatus (processors) 26, 28 that operate under control of one or more computer programs 30, 32 loaded from a non-transitory computer readable medium (memory) 34. As used herein, reference to a step performed by a computer program 30, 32 is also a reference to the processor 26, 28 that executed that step.

In some embodiments, the cameras 18, 20 may also be referred to as sensors 18, 20. In this regard, a processor 26, 28 within the camera 18, 20 or alarm panel 24 may receive successive frames of video from the cameras 18, 20 and compare the contents of the successive frames to detect the motion of intruders via changes among the successive frames.

Located within the secured area 12 may also be a user interface 36. The user interface 36 may be used to control the security system 10. For example, a user may enter a personal identification number and command to arm or disarm the security system 10. The status of the security system 10 may be shown on a display 38 of the user interface 36.

Operating within the alarm panel 24 is an event processor 26, 28 that monitors the sensors and saves detected events into an event file 42. Each event may be saved with an identifier of the sensor 14, 16, 18, 20 that detected the event and a time stamp of the event and duration of the event. Alternatively, the time stamp may be a time value at the instant of activation of the sensor 14, 16, 18, 20 and a time value at the instant of deactivation of the sensor.

Also operating within the alarm panel 24 may be a video processor 26, 28 that saves video from the cameras 18, 20 into a video file 44. The video may be stored as sequences of frames for a first predetermined time before and a second predetermined time after an event detected within a field of view of the camera. In this regard, the video frames may each be saved with a time stamp or other means of detecting the instant when the frame was captured by the camera. Alternatively, the frames of video from the cameras may be saved continuously within the file 44.

Figure 2:
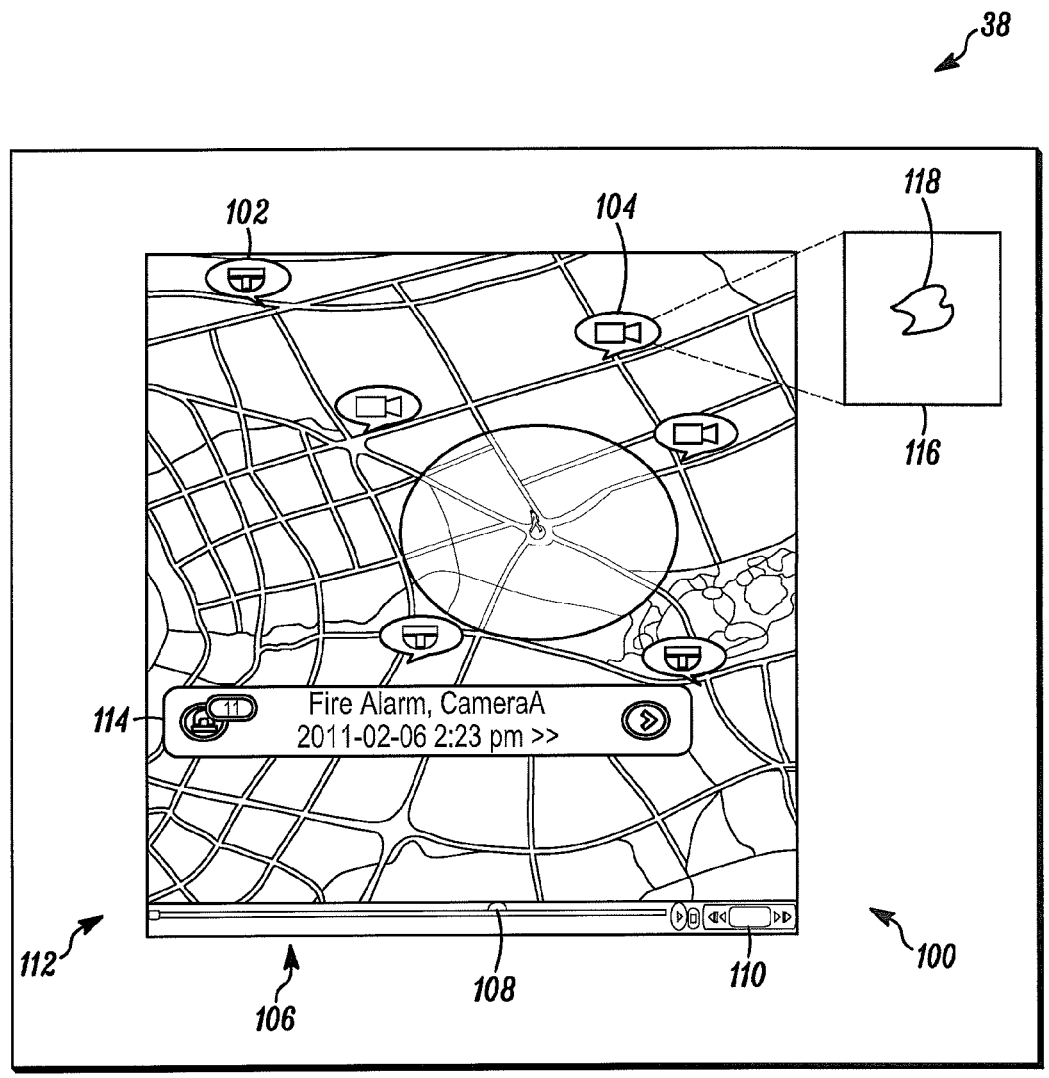
FIG. 2 depicts a display that may be used by the system of FIG. 1.

FIG. 2 depicts a two-dimensional map 100 of geographical features of the secured area 12. Superimposed on the map 100 may be a number of icons 102, 104 that are each associated with a respective sensor 14, 16 or camera 18, 20 of the security system.

The map 100 may be operated in a real-time mode or historical mode. In the real time mode, the respective icon 102, 104 is highlighted whenever the associated sensor 14, 16, 18 20 is activated. In the case of the sensor 14, 16, the opening of a door or window to which the sensor 14, 16 is attached would activate the sensor 14, 16. In the case of a camera acting as a sensor, the detection of motion within successive frames from a camera would activate the respective icon 102, 104 associated with the camera 18, 20.

Also included on the map 100 is an adjustable time control device 106. The adjustable time control device 106 may be a time scale with a moveable button 108. In this regard, a user may place a cursor 112 over the button 108, activate a switch associated with the cursor 112 and drag the button 108 to the left or right.

In this regard, if the button 108 is dragged to the extreme right, then the map 100 would operate in the real-time mode displaying the status of the sensors 14, 16, 18, 20 in real time. If the button 108 is dragged to the left, then the status of the sensors 14, 16, 18, 20 is displayed at some time in the past as indicated by a time value shown in a time indicator window 110. In this regard, the time value shown in the window 110 may be a month, day, year and the time of day in hours, minutes and seconds.

When operated in the historical mode, a comparison processor 26, 28 may compare the time value shown in the window 110 with the time values of any events stored in the event file 42. When the time values match, the icon 102, 104 associated with the sensor 14, 16, 18, 20 is highlighted on the map 100. Stated in another way, whenever the time value shown in the window 110 is between the time of activation of a sensor and deactivation of the sensor, the corresponding icon is highlighted.

In order to improve the usability of the map 100, only an image of the icon 102, 104 may be displayed on the map 100. On the other hand, if a user should place the cursor 112 over an icon 102, 104, then a window 114 of identifying information may be displayed adjacent the icon.

The adjustable time control device 106 provides a convenient mechanism for performing forensic analysis of events within the secured area 12. For example, in the case of an intruder entering the secured area, the intruder may sequentially activate a number of the sensors 14, 16, 18, 20. By moving the button to the left or right (backwards or forwards in time), the user could determine a succession of locations of the intruder and the time that the intruder was at each location as the intruder moved through the secured area.

In some embodiments, a display processor 26, 28 may detect a user selecting one of the camera icons 102, 104 and display video in an associated window 116. In this case, the display processor may retrieve a time value from the time indicator window 110 and retrieve a sequence of frames of video captured by the selected camera at the retrieved time instant. In this case, the sequence may begin a predetermined time before the time value within the window and continue through successive frames to a frame captured a predetermined time after the retrieved time value.

The ability to display video can be of great value in analyzing events. For example, if a door sensor 14, 16 were to be activated, then a user could move the button 108 backwards in time until the instant when the sensor was first activated. The user may then click on an icon 102, 104 of a camera having the door in the field of view of the camera and watch video from the camera from the instant when the sensor was activated.

In general, the system 10 implements a method including the steps of providing a two-dimensional map of geographical features of a secured area on a display, arranging a respective icon for each of a plurality of security sensors on the map, wherein a relative location of the respective icon of each of the plurality of security sensors on the two-dimensional map indicates the relative location of the sensor with respect to each of the geographical features of the map, and wherein the respective icon of each of the plurality of sensors that is activated is shown highlighted on the map, and providing an adjustable time control device with a time indicator on the map, the time control device causing each of the plurality of icons to enter a highlighted state during each concurrence in time between the activated state of the corresponding sensor and the time indicator.

In addition, the method may further include displaying an identifier of one of the plurality of sensors each time a cursor is placed over the corresponding icon. The method may include defining one of the plurality of sensors as a video camera. The method may include superimposing the video on the display in response to activating the icon with a cursor.

The method may include retrieving a video frame from a video archive where a recording instant of the retrieved frame corresponds to a time value shown in the time indicator. The method may include a user moving the adjustable time control device forward and backwards in time to identify, via the highlighting, an instant of activation of one of the plurality of sensors. The method may include the user activating one of the plurality of icons and, in response, displaying a sequence of video frames corresponding to the activated icon and to the instant of activation.

The system 10 may include a display that shows a two-dimensional map of geographical features of a secured area on the display, a respective icon for each of a plurality of security sensors disposed on the map, wherein a relative location of the respective icon of each of the plurality of security sensors on the two-dimensional map indicates the relative location of the sensor with respect to each of the geographical features of the map, and wherein the respective icon of each of the plurality of sensors that is in an activated state is shown highlighted on the map, and an adjustable time control device with a time indicator shown in conjunction with the map, the time control device causing each of the plurality of icons to enter a highlighted state during each concurrence in time between the activated state of the corresponding sensor and the time indicator.

In other embodiments, the system may further include a button on a time scale, wherein a user places a cursor over the button, selects the button and slides the button forwards and backwards in time across the time scale to select a time instant, or the context wherein the secured area further comprises a building.

The system may further include the context wherein the plurality of sensors further comprises a video camera, or an identification processor that displays an identifier of each sensor upon detecting a cursor disposed over the corresponding icon. The system may also include a time processor that compares a time value displayed by the time indicator with a time record of activation of each of the plurality of sensors and highlights the respective icon upon detecting that the sensor was activated at the instant of the time value, or a video processor that detects selection of one of the plurality of icons and plays a sequence of video frames associated with the selected icon and a time value shown on the time indicator.

The system may further include the context wherein the sequence of video frames further includes an initial frame recorded from a camera associated with the selected icon at the time instant shown by the time indicator and a final frame recorded a predetermined time period after the time instant. The system may include an identification processor that displays an identifier of each of the plurality of sensors upon detecting a cursor over the respective icon of the sensor.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
providing a two-dimensional map of geographical features of a secured area on a display;
arranging a respective icon for each of a plurality of security sensors on the two-dimensional map, at least one of the plurality of security sensors being a switch on a door or window providing entrance into or egress from the secured area, wherein a relative location of the respective icon of each of the plurality of security sensors on the two-dimensional map indicates a relative location of a respective security sensor with respect to each of the geographical features of the two-dimensional map;

highlighting the respective icon of each of the plurality of security sensors on the two-dimensional map in response to detection of a threat within the secured area by the respective security sensor; and providing an adjustable time control device with a time indicator on the two-dimensional map, the adjustable time control device causing the respective icon of each of the plurality of security sensors to enter a highlighted state during each concurrence in time between an activated state of the respective security sensor and the time indicator, wherein only images of the respective icon for each of the plurality of security sensors are shown on the two-dimensional map.

2. The method as in claim 1 further comprising displaying an identifier of one of the plurality of security sensors each time a cursor is placed over the respective icon.

3. The method as in claim 2 further comprising defining one of the plurality of security sensors as a video camera.

4. The method as in claim 3 further comprising displaying video from the video camera, wherein the video is superimposed on the display in response to activating the respective icon with the cursor.

5. The method as in claim 4 further comprising retrieving a video frame from a video archive, wherein a recording instant of the retrieved video frame corresponds to a time value shown in the time indicator.

6. The method as in claim 1 further comprising a user moving the adjustable time control device forward and backwards in time to identify via the highlighting, an instant of activation of one of the plurality of security sensors.

7. The method as in claim 6 further comprising the user activating the respective icon of the one of the plurality of security sensors and, in response, displaying a sequence of video frames corresponding to the activated icon and to the instant of activation.

8. An apparatus comprising:
a display that shows a two-dimensional map of geographical features of a secured area on the display;
a plurality of security sensors within the secured area, at least one of the plurality of security sensors being a switch on a door or window providing entrance into or egress from the secured area;
a respective icon for each of the plurality of security sensors disposed on the two-dimensional map, wherein a relative location of the respective icon of each of the plurality of security sensors on the two-dimensional map indicates a relative location of a respective security sensor with respect to each of the geographical features of the two-dimensional map;
a processor that highlights the respective icon of each of the plurality of security sensors on the two-dimensional map in response to detection of a threat within the secured area by the respective security sensor; and
an adjustable time control device with a time indicator shown in conjunction with the two-dimensional map, the adjustable time control device causing the respective icon of each of the plurality of security sensors to enter a highlighted state during each concurrence in time between an activated state of the respective security sensor and the time indicator, wherein only images of the respective icon for each of the plurality of security sensors are shown on the two-dimensional map.

9. The apparatus as in claim 8 wherein the adjustable time control device further comprises a button on a time scale, and wherein a user places a cursor over the button, selects the button and slides the button forwards and backwards in time across the time scale to select a time instant.

10. The apparatus as in claim 8 wherein the secured area further comprises a building.

11. The apparatus as in claim 8 wherein the plurality of security sensors further comprises a video camera.

12. The apparatus as in claim 8 further comprising an identification processor that displays an identifier of each of the plurality of security sensors upon detecting a cursor disposed over the respective icon.

13. The apparatus as in claim 8 further comprising a time processor that compares a time value displayed by the time indicator with a time record of activation of each of the plurality of security sensors and highlights the respective icon upon detecting that the respective security sensor was activated at the instant of the time value.

14. The apparatus as in claim 8 further comprising a video processor that detects selection of the respective icon of one of the plurality of security sensors and plays a sequence of video frames associated with the selected icon and a time value shown on the time indicator.

15. The apparatus as in claim 14 wherein the sequence of video frames further comprises an initial frame recorded from a camera associated with the selected icon at the time value shown by the time indicator and a final frame recorded a predetermined time period after the time value.

16. The apparatus as in claim 8 further comprising an identification processor that displays an identifier of each of the plurality of security sensors upon detecting a cursor over the respective icon of the respective security sensor.

17. An apparatus comprising:
a display processor that depicts a two-dimensional map of geographical features of a secured area on a display;
a plurality of security sensors within the secured area, wherein at least one of the plurality of security sensors is a switch on a door or window providing entrance into or egress from the secured area;
an icon processor that superimposes a respective icon for each of the plurality of security sensors on the two-dimensional map, wherein a relative location of the respective icon of each of the plurality of security sensors on the two-dimensional map indicates a relative location of a respective security sensor with respect to each of the geographical features of the two-dimensional map, and wherein the respective icon of each of the plurality of security sensors is shown highlighted on the two-dimensional map in response to detection of a threat within the secured area by the respective security sensor; and
an adjustable time control device with a time indicator shown in conjunction with the two-dimensional map, the adjustable time control device causing the respective icon of each of the plurality of security sensors to enter a highlighted state each time the adjustable time control device is used to select a time during which the respective security sensor was in an activated state wherein only images of the respective icon for each of the plurality of security sensors are displayed on the two-dimensional map.

18. The apparatus as in claim 17 further comprising a time record of activations for each of the plurality of security sensors, the time record containing a time of activation of the respective security sensor and a time of deactivation of the respective security sensor.

19. The apparatus as in claim 17 wherein one of the plurality of security sensors further comprises a video camera.

20. The apparatus as in claim 19 further comprising a display processor that displays a sequence of recorded video frames corresponding to the time selected through the adjustable time control device.

\* \* \* \* \*